United States Patent [19]

Nakamura et al.

[11] Patent Number: 5,680,224

[45] Date of Patent: Oct. 21, 1997

[54] FACSIMILE COMMUNICATION OF INFORMATION TERMINAL IN A TWO FIELD FORMAT AND RELAY OF SEPARATED DOCUMENT INFORMATION ONLY

[75] Inventors: Mitsuhiro Nakamura; Kohichi Shibata; Masakazu Oyama; Toshihiro Mori, all of Osaka, Japan

[73] Assignee: Mita Industrial Co., Ltd., Osaka, Japan

[21] Appl. No.: 350,688

[22] Filed: Dec. 7, 1994

[30] Foreign Application Priority Data

Dec. 7, 1993 [JP] Japan ................... 5-306765

[51] Int. Cl.⁶ ................................................. H04N 1/32
[52] U.S. Cl. ........................................ 358/407; 358/440
[58] Field of Search ................................ 358/440, 468, 358/402, 407, 434, 435, 436, 438, 439; 379/100

[56] References Cited

U.S. PATENT DOCUMENTS

| | | | |
|---|---|---|---|
| 4,849,816 | 7/1989 | Yoshida | 358/434 |
| 5,157,514 | 10/1992 | Yoshioka | 358/407 |
| 5,206,743 | 4/1993 | Hochman et al. | 358/440 |
| 5,237,428 | 8/1993 | Tajitsu | 358/440 |
| 5,247,368 | 9/1993 | Siegmund et al. | 358/440 |
| 5,247,591 | 9/1993 | Baran | 382/179 |
| 5,287,199 | 2/1994 | Zoccolillo | 358/407 |
| 5,465,167 | 11/1995 | Cooper et al. | 358/465 |
| 5,477,339 | 12/1995 | Sugawara et al. | 358/406 |

Primary Examiner—Scott A. Rogers
Attorney, Agent, or Firm—Rabin, Champagne & Lynt, P.C.

[57] ABSTRACT

A facsimile communication method according to which a relay broadcast mode is set by an operator, in which receiving station numbers or the like are inputted from an operating section, and the receiving station numbers are stored in a first memory block. When a start key is operated in this state, a document set in a scanner section is read, and image data corresponding to the read document are sequentially stored in a second memory block. Information on the document corresponding to one page is read, and the receiving station numbers are read out of the first memory block to produce a transmission frame. Further, the image data are read out of the second memory block, to produce a transmission frame. The produced transmission frames are sequentially transmitted to a relay station. Thus, the receiving station numbers are transmitted as a part of the information.

17 Claims, 7 Drawing Sheets

F I G. 1
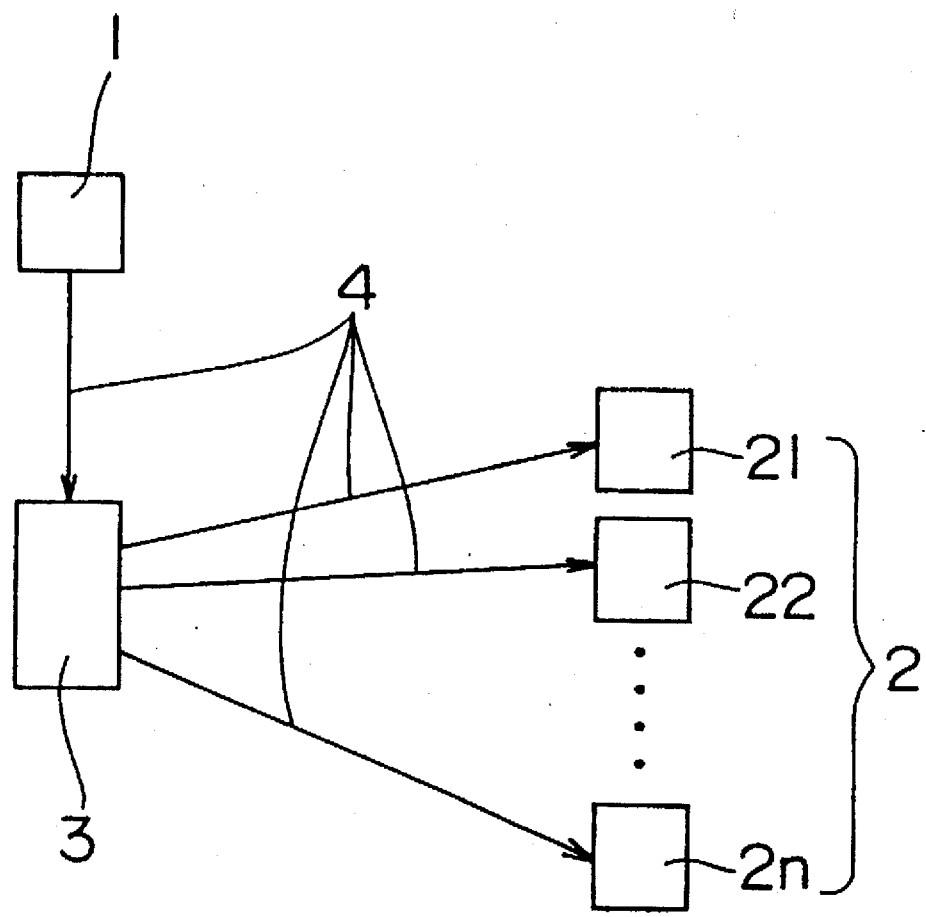

F I G. 4
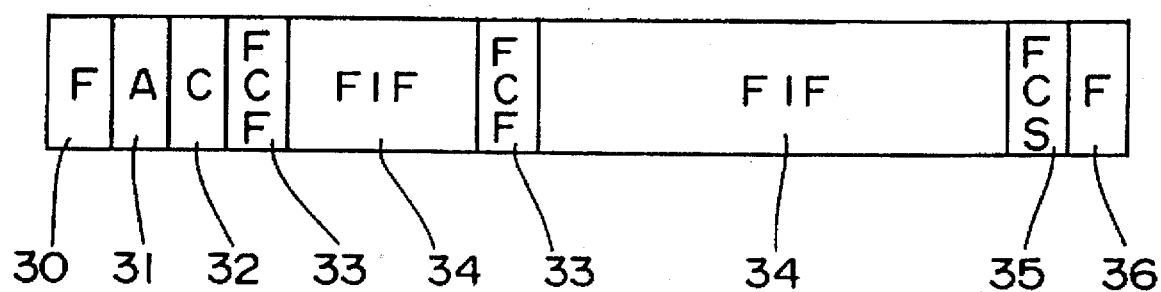

FACSIMILE COMMUNICATION OF INFORMATION TERMINAL IN A TWO FIELD FORMAT AND RELAY OF SEPARATED DOCUMENT INFORMATION ONLY

BACKGROUND OF THE INVENTION

1. Field of the Invention

The present invention relates to a facsimile communication method applied when the operation of a called terminal device is controlled from a calling terminal device and a facsimile station for carrying out the facsimile communication method.

2. Description of the Related Art

Facsimile communication for transmitting information corresponding to an original image formed on a document through a telephone line has been conventionally widely established.

Facsimile communication has been generally established in accordance with the transmission control procedure (protocol) defined in CCITT recommendation T.30. In the transmission control procedure, the type of control signal transmitted from each of facsimiles, the transmission timing of the control signal, and the like are defined. If an attempt to transmit information corresponding to an original image formed on one document of A4 size of Japanese Industrial Standard is made, for example, in accordance with the transmission control procedure, approximately 30 seconds were formerly required as the total communication time. In recent years, approximately 20 seconds have been required, due to the improvement in the communication capability of a modem. In addition, approximately 10 to 15 seconds have been required in the case of a high speed facsimile (MMR/ECM, an apparatus for establishing communication at 14.4 kbps).

One of facsimile communication methods includes a communication method referred to as relay broadcast (designate) communication. This relay broadcast communication is a communication method in which if it is desired to transmit the same information from a certain facsimile station (hereinafter referred to as a "transmission station") to a plurality of facsimile stations (hereinafter referred to as "receiving stations"), the information is not directly transmitted to each of the receiving stations to which the information is to be transmitted but is transmitted to another facsimile station (hereinafter referred to as a "relay station") once and then, transmitted to the receiving stations from the relay station.

In relay broadcast communication, the transmission station must give a facsimile number (hereinafter referred to as a "receiving station number") of each of the receiving stations to the relay station.

The receiving station number is transmitted as a transmission control signal prior to transmitting the information, for example. Specifically, in addition to each of the control signals in the transmission control procedure defined in the above described CCITT recommendation T.30, a dial number list (hereinafter referred to as "DNL") signal representing a receiving station number which is not defined in the above described transmission control procedure is transmitted from the transmission station to the relay station.

FIG. 7 is a diagram showing a signal sequence between the transmission station and the relay station. If a line is connected between the transmission station and the relay station, CNG (Calling tone) indicating that the facsimile is a voiceless terminal is transmitted from the transmission station to the relay station. CED (Called Station Identification) is transmitted in response to the CNG from the relay station, and DIS (Digital Identification Signal) indicating a standard receiving function and NSF (Non-Standard Facilities), which is a non-standard facilities signal, are further transmitted therefrom. The transmission station which received the NSF confirms that the relay station has a relay broadcast communication function on the basis of the received NSF, and then transmits NSS (Non-Standard Facilities Set-up), which is a non-standard facilities set-up signal for designating the relay broadcast communication function. Thereafter, MCF (Message Confirmation), indicating that reception is confirmed, is transmitted from the relay station. The transmission station which received the MCF transmits a DNL signal indicating a receiving station number. Thereafter, CFR (Confirmation to Receive), indicating that preparation for reception is completed, is transmitted from the relay station. The transmission station which received the CFR transmits information.

The relay station calls each of the receiving stations on the basis of the receiving station number given as the DNL signal from the transmission station and transfers to the receiving station the information from the transmission station.

Another conventional technique for realizing relay broadcast communication is disclosed in Japanese Unexamined Patent Publication No. 284167/1989, for example. In the conventional example, a receiving station number is given to a relay station using an OCR (Optical Character Reader) sheet. In this method, an operator enters the receiving station number in the OCR sheet, and transmits an image on the OCR sheet prior to transmitting a document. In the relay station, the received image on the OCR sheet is stored in a memory once, and the receiving station number is character-recognized on the basis of the image on the OCR sheet which is stored in the memory. Thereafter, the relay station calls a receiving station corresponding to the character-recognized receiving station number, and transmits an image already transmitted to the receiving station subsequently to the image on the OCR sheet. According to the conventional example, therefore, it is possible to inform the relay station of the receiving station number even if no DNL signal is transmitted.

If a document to be transmitted is one document of A4 size, approximately 10 to 15 seconds are required using a high speed facsimile, as described above, as the total communication time in a case where no DNL signal is transmitted. On the other hand, approximately 30 seconds are required even if the same high speed facsimile is used as the total communication time in a case where a DNL signal is transmitted. A main reason for this delay is that it takes relatively long to transmit a DNL signal and wait for a response signal. Specifically, if the receiving station number is given to the relay station by the DNL signal, additional communication time is required, resulting in increased communication costs.

On the other hand, in the above described conventional technique using the OCR sheet, a DNL signal need not be transmitted, whereby the above described problem does not occur. However, since the operator at the transmission station must enter necessary items in a dedicated OCR sheet, preparation work becomes complicated. Furthermore, additional transmission time is required to transmit the OCR sheet.

SUMMARY OF THE INVENTION

The present invention has been made in order to overcome the above described technical problems and to provide a facsimile communication method in which control information for controlling the operation of a called terminal device can be transmitted in a short time and the work of an operator is not complicated.

Another object of the present invention is to provide a facsimile station for carrying out the above described facsimile communication method.

The present invention provides a facsimile communication method for transmitting information from a calling terminal device to a called terminal device through a predetermined communication line, which is characterized in that the calling terminal device transmits control information inputted from an operating section so as to control the operation of the called terminal device to the predetermined communication line as a part of the information, and the called terminal device extracts the control information from the information received from the calling terminal device through the predetermined communication line and operates in accordance with the extracted control information.

Furthermore, the present invention provides a facsimile station or terminal for transmitting information to a called terminal device connected through a predetermined communication line, which is characterized as including an operating section for inputting control information for controlling the operation of the called terminal device, and means for transmitting the inputted control information to the predetermined communication line as a part of information to be transmitted.

Additionally, the present invention provides a facsimile station for receiving information from a calling terminal device connected through a predetermined communication line, which is characterized as including means for examining whether or not control information for controlling the operation of the facsimile is included in the information received from the calling terminal device through the predetermined communication line, means for extracting the control information from the information when the control information is included in the information, and means for controlling the operation of the facsimile station on the basis of the extracted control information.

According to the present invention, in the calling terminal device, control information for controlling the operation of the called terminal device is inputted from the operating section, and the inputted control information is transmitted to the predetermined communication line as a part of information to be transmitted. On the other hand, in the called terminal device, the control information in the received information is extracted, and an operation conforming to the extracted control information is performed.

The control information is thus transmitted as a part of the information, thereby to make it possible to significantly reduce communication time, as compared with a case where the control information is transmitted as a procedure signal before the transmission of the information.

Furthermore, the control information may be inputted from the operating section, thereby eliminating the necessity of entering the control information in an OCR sheet.

According to the present invention, therefore, communication costs can be reduced, as compared with the conventional costs. In addition, preparation work for communication is significantly simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual diagram showing one example of a relay broadcast communication system to which one embodiment of the present invention is applied;

FIG. 4 is a diagram showing one example of a transmission frame;

DETAILED DESCRIPTION OF THE PREFERRED EMBODIMENTS

FIG. 1 is a conceptual diagram showing one example of a relay broadcast (designate) communication system to which one embodiment of the present invention is applied. The relay broadcast communication system comprises a facsimile station 1 which is a called terminal device for transmitting information corresponding to a document to be transmitted (hereinafter referred to as a "transmission station 1"), a plurality of facsimile stations 2 in which the information transmitted from the transmission station 1 is to be finally received (hereinafter referred to as "receiving stations 21, 22, . . . , 2n") (generically referred to as "receiving stations 2"), and a facsimile station serving as a called terminal device for receiving the information transmitted from the transmission station 1 once and relaying the information to each of the receiving stations 2 (hereinafter referred to as a "relay station 3"). The respective stations 1, 2 and 3 are connected to each other by a telephone line 4.

Figure 2:
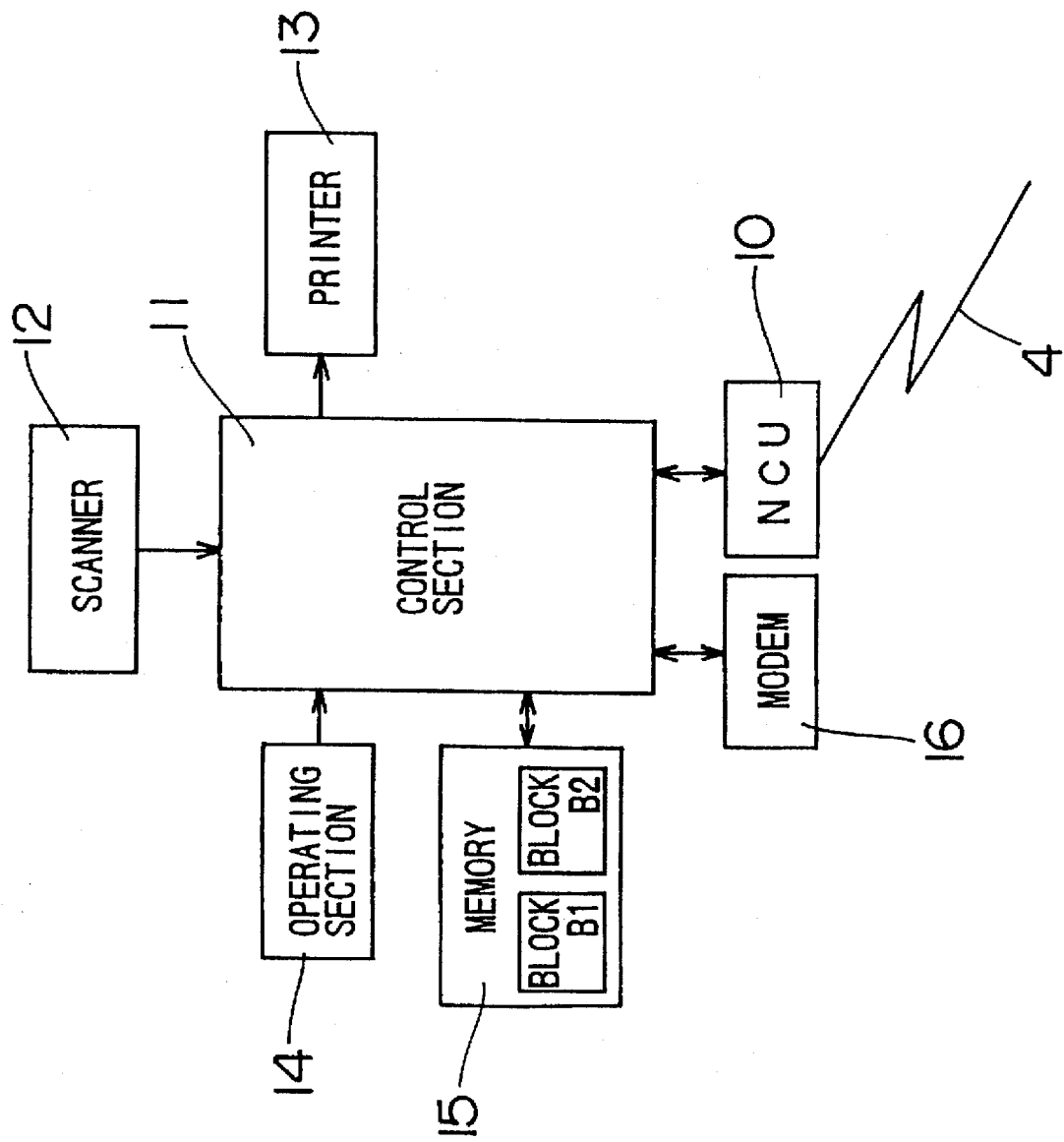
FIG. 2 is a block diagram showing the electrical construction of a facsimile station according to one embodiment of the present invention.

FIG. 2 is a block diagram showing the electrical construction of each of the above described facsimile stations 1, 2 and 3. This facsimile station is applied to any one of the transmission station 1, the receiving stations 2 and the relay station 3, and comprises a control section 11 connected to the telephone line 4 through a network control unit (NCU) 10, a scanner 12 for reading a document to be transmitted, and a printer 13 for recording on paper information received through the telephone line 4. An operating section 14 for inputting a facsimile number of each of the receiving stations 2 (hereinafter referred to as a "receiving station number") and a facsimile number of the relay station 3 (hereinafter referred to as a "relay station number"), and a memory 15 composed of a RAM (Random Access Memory) and the like, and a modem 16 are connected to the control section 14.

The scanner 12 comprises in its inner part an image sensor (not shown) for optically reading a document to generate image data. The image sensor electrically scans the document in a predetermined direction of horizontal scanning. The document is conveyed in a direction of vertical scanning intersecting the direction of horizontal scanning, thereby achieving vertical scanning. The image data outputted from the scanner 12 is subjected to binary-coding processing and compression coding processing and then, is inputted to the control section 11. If the image data is inputted to the control section 11 from the scanner 12, the image data is stored in the memory 15. In addition, if information is inputted to the control section 11 from the telephone line 4 through the NCU 10, the information is stored in the memory 15.

The operating section 14 comprises a start key, a ten-key or a numeric key for inputting a number, and a mode setting key. The mode setting key is a key for setting an operation mode of the facsimile station. Examples of the operation mode include a normal mode for establishing normal one-to-one facsimile communication and a relay broadcast mode for establishing relay broadcast communication.

A storage area of the memory 15 includes a block B1 and a block B2. The block B1 is an area storing a receiving station number and a relay station number. The block B2 is an area storing image data.

Figure 3:
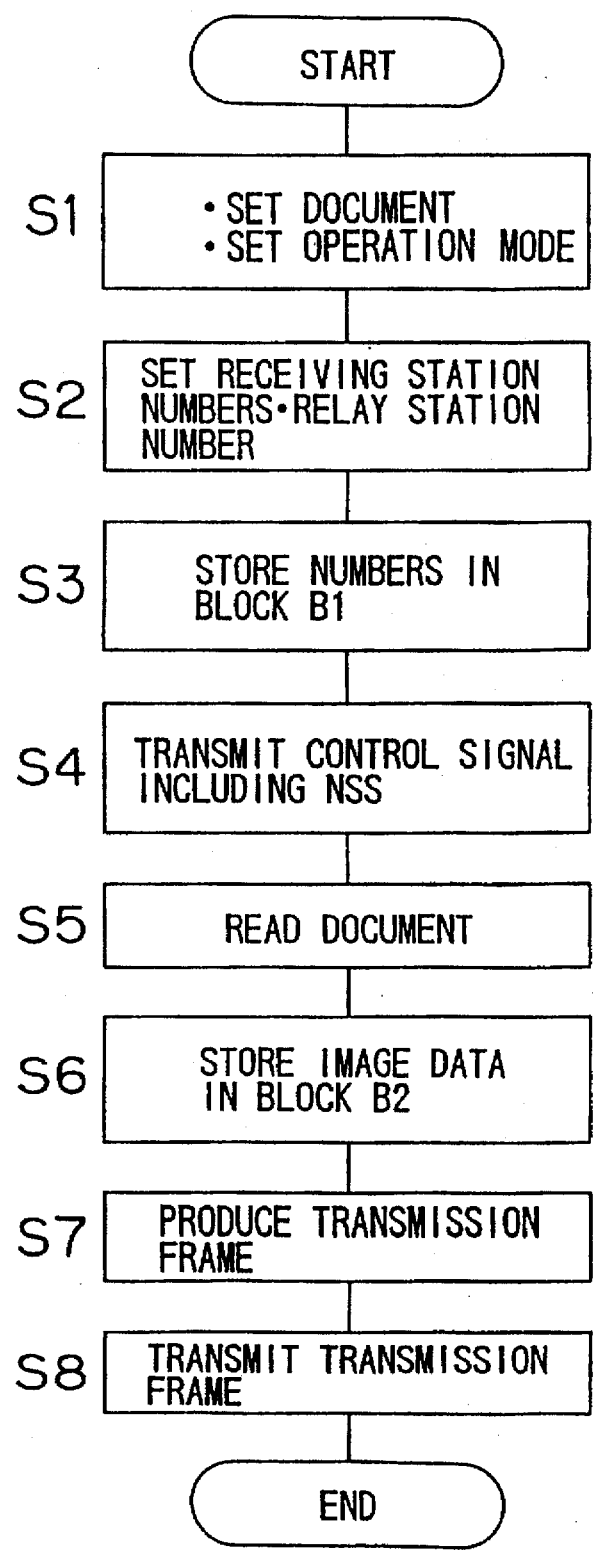
FIG. 3 is a flow chart showing operations performed by a transmission station according to one embodiment of the present invention.

FIG. 3 is a flow chart showing operations performed by the above described transmission station 1. An operator sets a document to be transmitted in the scanner 12, and operates the operation section 14 to set an operation mode (step S1). In establishing relay broadcast communication, the operation mode is set to a relay broadcast mode, and receiving station numbers and a relay station number are further set (step S2). The set receiving station numbers and the set relay station number are stored in the block B1 in the memory 15 (step S3).

The operator then operates the start key to start transmission. In response thereto, the control section 11 reads out the relay station number stored in the block B1 in the memory 15, and calls the relay station 3. If the relay station 3 is called, various control signals including NSS, which is a non-standard facilities set-up signal, are transmitted to the telephone line 4 (step S4). In the transmission station 1, the document is read page by page by the scanner 12 (step S5) at the same time that the above described NSS is transmitted, and image data corresponding to the document are sequentially stored in the block B2 in the memory 15 (step S6). If the reading of information on the document corresponding to one page is terminated, the control section 11 produces a transmission frame of a predetermined type (step S7), and transmits the transmission frame to the telephone line 4 (step S8). Consequently, the transmission of the information is achieved. At this time, the control section 11 first reads out the receiving station numbers from the memory 15, prepares a transmission frame corresponding to the receiving station numbers read out, and transmits the transmission frame to the telephone line 4. Subsequently, the transmission frame corresponding to the image data is then prepared and transmitted.

The receiving station numbers are thus transmitted as a part of the information corresponding to the first page. Normal operations are performed with respect to the communication of information corresponding to the second page and the subsequent pages.

NSS transmitted prior to transmitting the information includes information representing a relay broadcast mode and a flag indicating that receiving station numbers and image data are transmitted as information corresponding to the first page. This flag makes it possible to recognize in the relay station 3 that the receiving station numbers are included in the information corresponding to the first page.

FIG. 4 is a diagram showing the construction of the above described transmission frame. The transmission frame is of a HDLC (High-Level Data Link Control Procedure) type which is defined in CCITT recommendation T.30.

More specifically, the above described transmission frame comprises a flag sequence (F) 30 indicating the start of the frame, an address field (A) 31, a control field (C) 32, a facsimile control field (FCF) 33, data (FIF) 34 corresponding to information, a frame check sequence (FCS) 35 for detecting an error, and a flag sequence (F) 36 indicating the termination of the frame. The FCF 33 includes information for indicating which of receiving station numbers or image data are the data 34 subsequent to the FCF 33.

When the receiving station numbers are transmitted as a part of the information corresponding to the first page, data which are receiving station numbers are inserted subsequently to the first FCF 33, the second FCF 33 is inserted, and image data is inserted subsequently to the second FCF 33 in the transmission frame.

Figure 5:
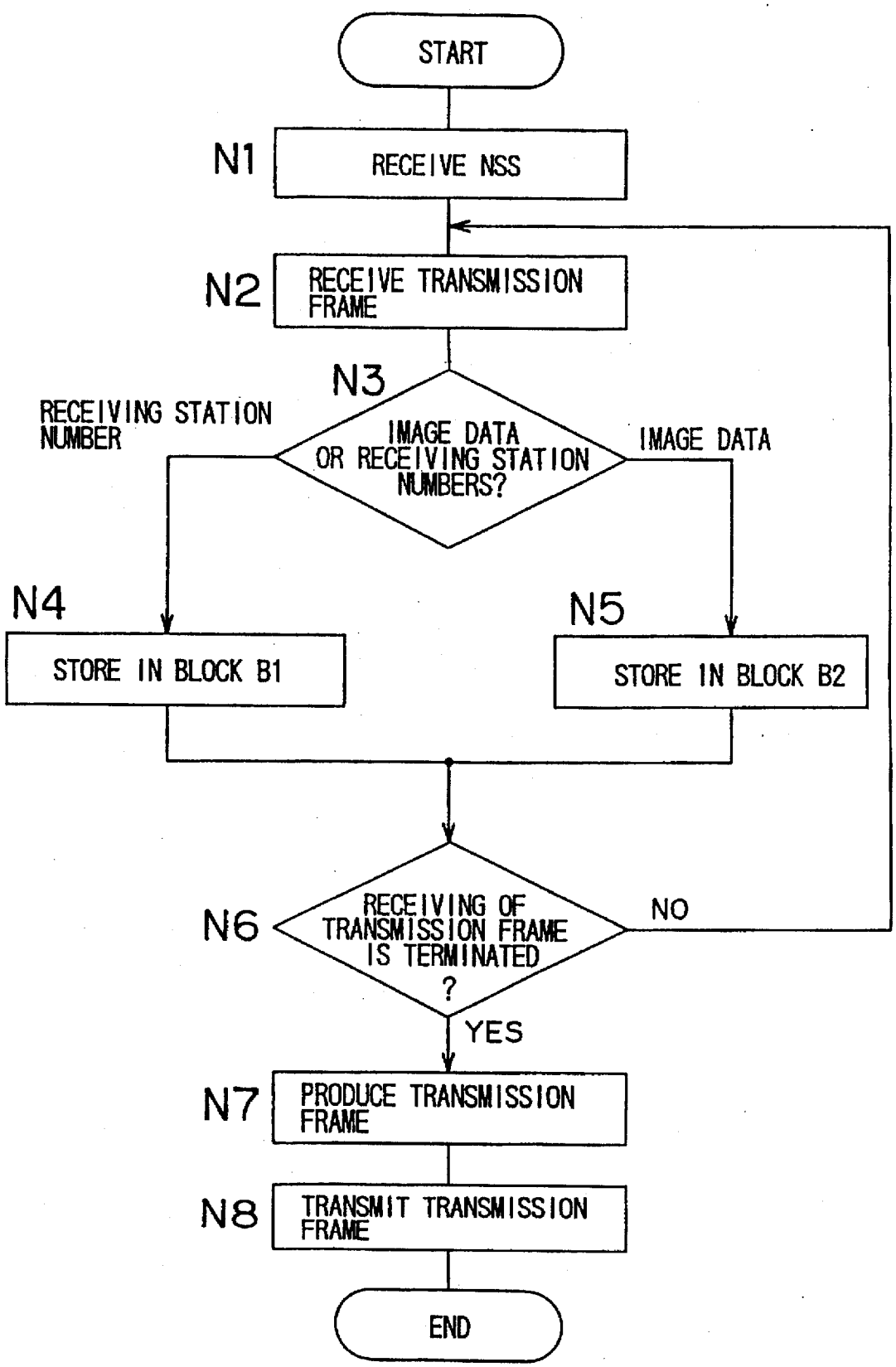
FIG. 5 is a flow chart showing operations performed by a relay station according to one embodiment of the present invention.

FIG. 5 is a flow chart showing operations performed by the relay station 3. In the control section 11 in the relay station 3, if NSS is received through the telephone line 4 (step N1), it is judged whether or not a relay broadcast mode is set on the basis of the NSS. When the relay broadcast mode is set, the control section 11 is responsive to the receiving of a transmission frame corresponding to image data (step N2) for examining a facsimile control field 33 in the transmission frame. It is judged which of receiving station numbers and image data is data 34 included in the transmission frame on the basis of the contents of the facsimile control field 33 (step N3). As a result, if the data 34 is receiving station numbers, a data portion of a receiving frame is stored in the block B1 in the memory 15 (step N4). On the other hand, if the data 34 is image data, the data portion of the receiving frame is stored in the block B2 in the memory 15 (step N5).

If all transmission frames have been thus received (step N6), the following operations are preformed in the relay station 3. Specifically, the control section 11 reads out receiving station numbers one by one stored in the block B1 in the memory 15, and calls a receiving station 2 one by one corresponding to the receiving station numbers. If the receiving station 2 corresponding to the receiving station number is called, image data stored in the block B2 in the memory 15 is read out, a transmission frame corresponding to the image data read out is produced (step N7), and the transmission frame produced is transmitted to the telephone line 4 (step N8). Such operations are performed with respect to all receiving stations 2 corresponding to receiving station numbers stored in the block B1 in the memory 15.

In the receiving station 2, if a transmission frame is received, an original image corresponding to information included in the received transmission frame is recorded on paper through the same process as the normal operations of the facsimile. Consequently, relay broadcast communication is achieved.

Figure 6:
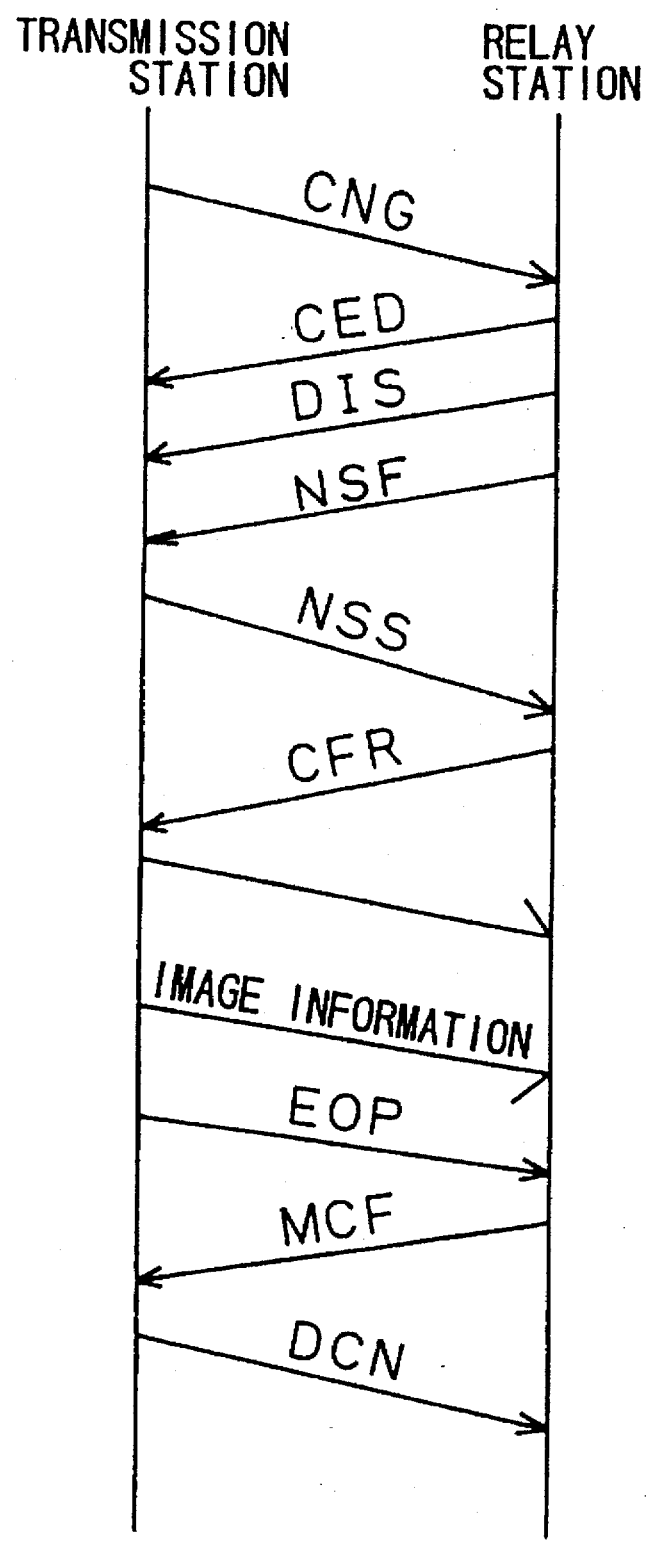
FIG. 6 is a diagram showing a signal sequence between the transmission station and the relay station according to one embodiment of the present invention.
Figure 7:
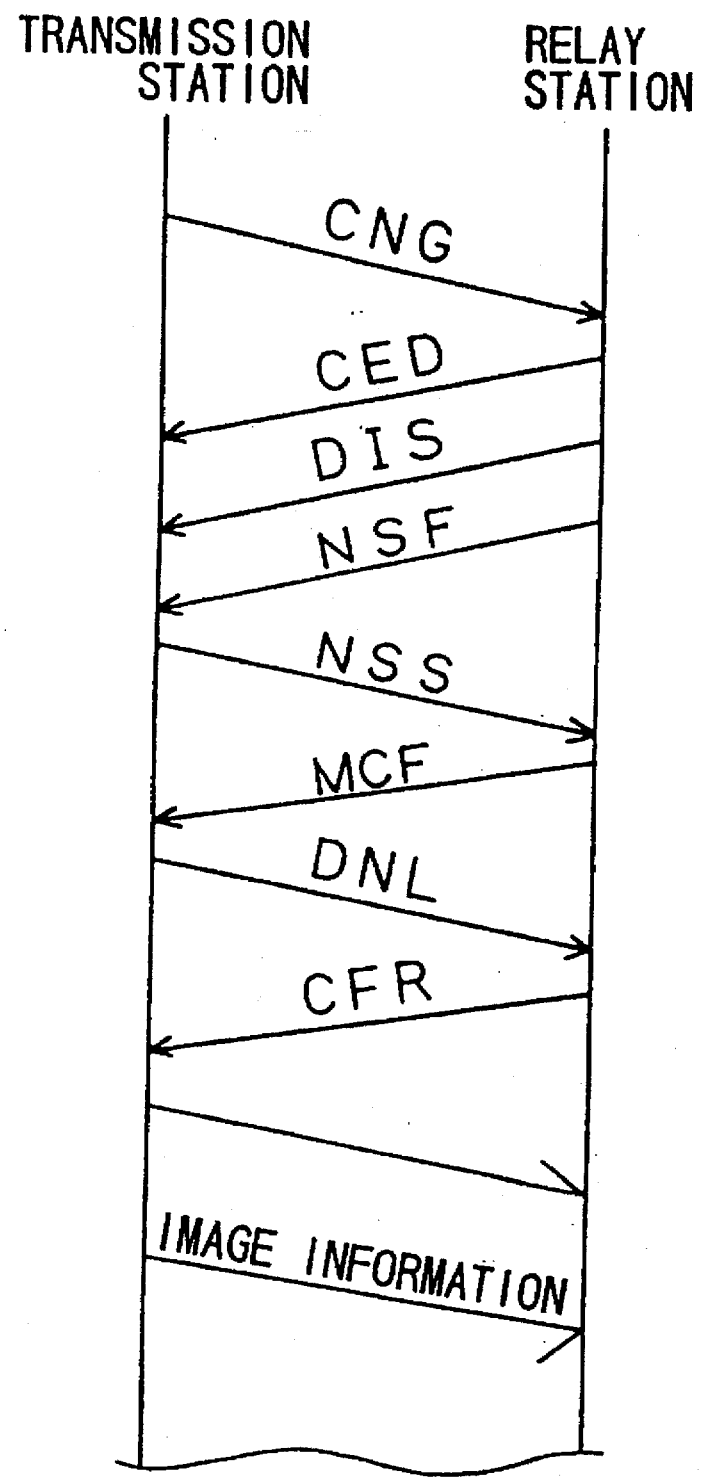
FIG. 7 is a diagram showing a signal sequence between a transmission station and a relay station in the conventional example.

FIG. 6 is a diagram showing a signal sequence between the transmission station 1 and the relay station 3. If a line is connected between the transmission station 1 and the relay station 3, CNG is transmitted from the transmission station 1, CED is transmitted from the relay station 3 which received the CNG and subsequently, NSF and DIS are transmitted. The transmission station 1 which received the NSF confirms that the relay station 3 has a relay broadcast communication function on the basis of the received NSF and then transmits NSS.

The NSS is an option signal whose contents can be freely set by a maker of the facsimile. In the present embodiment, the NSS includes an identification code indicating whether or not a relay broadcast mode is set in the transmission station 1 and a flag indicating that receiving station numbers and image data are transmitted as information corresponding to the first page, as described above.

If the relay station 3 is ready for receiving after the NSS is received in the relay station 3, CFR is transmitted. Information is transmitted from the transmission station 1 which received the CFR. Information corresponding to the first page includes receiving station numbers and image data, as described above. If all information has been transmitted, EOP (End of Procedures), indicating that transmission is terminated, is transmitted from the transmission station 1. MCF, indicating that receiving is confirmed, is transmitted from the relay station 3 which received the EOP, and DCN (Disconnect), indicating that a line is disconnected, is transmitted from the transmission station 1 which received the MCF, to disconnect the line.

As described in the foregoing, according to the relay broadcast communication system in the present embodiment, the receiving station numbers are transmitted as a part of the information, thereby making it possible to reliably establish relay broadcast communication without transmitting a DNL signal representing receiving station numbers as a part of the transmission control procedure. Therefore, communication time in the relay broadcast communication can be made approximately the same as communication time in the normal communication, thereby making it possible to reduce communication costs, as compared with the conventional costs.

Furthermore, the receiving station numbers need not be entered in an OCR sheet and transmitted, thereby making it possible to significantly simplify the preparation work for the relay broadcast communication.

In the above described embodiment, a case where the number of relay stations 3 is one is taken as an example, the same information may be broadcast to a plurality of relay stations 3 from the transmission station 1. In that case, the same processing as described above is performed in each of the relay stations 3.

Furthermore, the number of receiving stations 2 may be at least one.

The present invention is not limited to the above described embodiment. Although in the above described embodiment, the relay broadcast communication was described by way of example, the present invention is also applicable to so-called confidential communication. More specifically, in the confidential communication, a plurality of confidential boxes respectively assigned particular numbers are set in an area of a memory of a facsimile station on the receiving side. If the confidential box number is designated from a facsimile on the transmission side to transmit information, the information is stored in the confidential box corresponding to the confidential box number. The information stored in the confidential boxes can be printed and outputted, provided that passwords respectively set in the confidential boxes are inputted.

In confidential communication, a desired confidential box number must be transmitted from the facsimile station on the transmission side, as described above. The confidential box number has been conventionally transmitted using a procedure signal before the transmission of information. If the confidential box number is transmitted as a part of the information utilizing the present invention, time required for the procedure before communication can be reduced, thereby making it possible to significantly reduce communication time.

Furthermore, the present invention is widely applicable to not only relay broadcast communication and confidential communication but also to facsimile communication for transmitting control information other than information required for normal facsimile communication.

According to the above described embodiment, in the transmission station, a receiving station number is key-inputted in establishing relay broadcast communication. If receiving station numbers are previously registered in a memory, however, a receiving station number in the memory may be transmitted as a part of information.

Various design changes can be made in the range in which the gist of the present invention is not changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of establishing facsimile communication from a transmission terminal to at least one receiving terminal through a relay terminal, comprising the steps of:

providing at least one receiving terminal number to the transmission terminal to specify at least one corresponding receiving terminal;

providing a relay terminal number to the transmission terminal to specify the relay terminal;

writing document information to the transmission terminal;

formatting the document information and one of the at least one receiving terminal numbers into a predetermined transmission frame format, to form formatted document information;

transmitting the formatted document information to the specified relay terminal;

separating the receiving terminal number from the formatted document information at the relay terminal to obtain separated document information that excludes the receiving terminal number; and transmitting the separated document information from the relay terminal to the specified receiving terminal;

wherein the formatted document information comprises
a first facsimile control field indicating the presence of the receiving terminal number,
a receiving terminal number corresponding to the first facsimile control field,
a second facsimile control field indicating the presence of the document information, and
document information corresponding to the second facsimile control field.

2. The method according to claim 1, wherein the transmission terminal, the relay terminal, and the receiving terminal are connected to each other by a telephone line.

3. The method according to claim 2, wherein the transmission terminal temporarily stores the receiving terminal number.

4. The method according to claim 3, wherein the transmission terminal temporarily stores the document information.

5. The method according to claim 4, wherein the transmission terminal inserts the receiving terminal number in a header portion of the formatted document information.

6. An apparatus for performing the method according to claim 3, wherein the transmission terminal is a facsimile terminal which comprises a scanner for reading information from a physical document, a numeric keypad for generating number data, and a first memory for temporarily storing the number data.

7. The apparatus according to claim 6, wherein the facsimile terminal further comprises a second memory for temporarily storing the information read by the scanner.

8. The apparatus according to claim 7, wherein the facsimile terminal further comprises transmission frame producing means for reading the number data and the scanner information which are stored in the first memory and the second memory, respectfully, to produce the predetermined transmission frame format.

9. An apparatus for performing the method according to claim 5, wherein the relay terminal is a facsimile terminal which comprises a memory for storing the formatted document information, means for extracting the receiving terminal number from the formatted document information stored in the memory, means for dialing the extracted receiving terminal number, and means for reading the document information and for transmitting the document information to the specified receiving terminal.

10. A facsimile communication method for transmitting document information from a calling terminal device to a called terminal device over a predetermined communication line, comprising the steps of:

providing control information from an operating section to the calling terminal device, formatting the document information into a predetermined transmission frame format including the control information, to provide formatted document information, transmitting the formatted document information, from the calling terminal device to the called terminal device over the predetermined communication line, to control operation of the called terminal device, extracting the control information from the formatted document information at the called terminal device, and operating the called terminal device in accordance with the extracted control information, wherein the formatted document information comprises a first facsimile control field indicating the presence of the control information, control information corresponding to the first facsimile control field, a second facsimile control field indicating the presence of the document information, and document information corresponding to the second facsimile control field.

11. The method according to claim 10, wherein the calling terminal device is a transmission terminal, and wherein the called terminal device is a relay terminal, and further comprising the step of transferring the document information from the relay terminal to at least one receiving terminal.

12. The method according to claim 10, wherein the control information includes a confidential box number for specifying a predetermined memory area of the called terminal device.

13. The method according to claim 12, wherein the called terminal device stores the information transmitted from the calling terminal device in the predetermined memory area specified by the confidential box number.

14. The method according to claim 1, wherein the formatted document information includes a control field; and the relay terminal separates the receiving terminal number from the formatted document information in accordance with the control field.

15. The method according to claim 1, wherein the transmission terminal includes a first memory block for storing the receiving terminal number, and a second memory block for storing the document information; the relay terminal includes a third memory block for storing the receiving terminal number, and a fourth memory block for storing the document information; and the receiving terminal includes a fifth memory block for storing the receiving terminal number, and a sixth memory block for storing the document information.

16. The method of claim 10, wherein the formatted document information includes a control field; and the called terminal device extracts the control information from the formatted document information in accordance with the control field.

17. The method of claim 10, wherein the calling terminal device includes a first memory block for storing the control information, and a second memory block for storing the document information; and the called terminal device includes a third memory block for storing the control information, and a fourth memory block for storing the document information.

* * * * *